United States Patent
Gross et al.

(10) Patent No.: US 9,317,469 B2
(45) Date of Patent: Apr. 19, 2016

(54) NETWORK WITH DISTRIBUTED SHARED MEMORY

(75) Inventors: Jason P. Gross, Portland, OR (US); Ranjit B. Pandit, Hillsboro, OR (US); Clive G. Cook, Portland, OR (US); Thomas H. Matson, Portland, OR (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 13/229,281

(22) Filed: Sep. 9, 2011

(65) Prior Publication Data

US 2011/0320558 A1 Dec. 29, 2011

Related U.S. Application Data

(63) Continuation of application No. 12/266,490, filed on Nov. 6, 2008, now abandoned.

(60) Provisional application No. 60/986,377, filed on Nov. 8, 2007.

(51) Int. Cl.
*G06F 15/167* (2006.01)
*G06F 12/08* (2006.01)
*H04L 29/08* (2006.01)

(52) U.S. Cl.
CPC .......... *G06F 15/167* (2013.01); *G06F 12/0813* (2013.01); *H04L 67/1097* (2013.01); *H04L 67/2842* (2013.01)

(58) Field of Classification Search
CPC .............. G06F 12/0813; G06F 15/167; H04L 67/2842; H04L 67/1097
See application file for complete search history.

(56) References Cited

U.S. PATENT DOCUMENTS 5,893,140 A * 4/1999 Vahalia et al. ................ 711/118
6,148,377 A 11/2000 Carter et al.
(Continued)

FOREIGN PATENT DOCUMENTS

JP 2001-125830 5/2001
KR 10-2003-0040206 5/2003
(Continued)

OTHER PUBLICATIONS

"Comparing Paradigms: Virtual Shared Memory vs. Message-Passing," Scientific Computing Associates, Inc., http://www.lindaspaces.com/products/vsm_mp.html, Accessed May 19, 2009.
(Continued)

*Primary Examiner* — Scott B Christensen
*Assistant Examiner* — Thomas Richardson
(74) *Attorney, Agent, or Firm* — Baker Botts L.L.P.

(57) ABSTRACT

A computer network with distributed shared memory, including a clustered memory cache aggregated from and comprised of physical memory locations on a plurality of physically distinct computing systems. The network also includes a plurality of local cache managers, each of which are associated with a different portion of the clustered memory cache, and a metadata service operatively coupled with the local cache managers. Also, a plurality of clients are operatively coupled with the metadata service and the local cache managers. In response to a request issuing from any of the clients for a data item present in the clustered memory cache, the metadata service is configured to respond with identification of the local cache manager associated with the portion of the clustered memory cache containing such data item.

31 Claims, 6 Drawing Sheets

(56) References Cited

U.S. PATENT DOCUMENTS

| | | | |
|---|---|---|---|
| 6,389,420 B1 * | 5/2002 | Vahalia et al. | 1/1 |
| 6,389,513 B1 | 5/2002 | Closson | |
| 6,640,285 B1 | 10/2003 | Bopardikar et al. | |
| 6,832,253 B1 | 12/2004 | Auerbach | |
| 7,058,763 B2 | 6/2006 | Gabber et al. | |
| 7,181,578 B1 | 2/2007 | Guha et al. | |
| 7,725,558 B2 * | 5/2010 | Dickenson | 709/215 |
| 2004/0019751 A1 | 1/2004 | Sharma et al. | |
| 2004/0025052 A1 * | 2/2004 | Dickenson | 713/201 |
| 2004/0117579 A1 | 6/2004 | Wu et al. | 711/170 |
| 2005/0044080 A1 * | 2/2005 | Fridella et al. | 707/10 |
| 2005/0091276 A1 | 4/2005 | Brunswig et al. | |
| 2005/0188055 A1 | 8/2005 | Saletore | |
| 2006/0029074 A2 | 2/2006 | Bauer | |
| 2006/0155779 A1 | 7/2006 | Kim et al. | 707/201 |
| 2006/0173956 A1 | 8/2006 | Ulrich et al. | |
| 2006/0248088 A1 | 11/2006 | Kazar et al. | |
| 2007/0022264 A1 | 1/2007 | Bromling et al. | |
| 2007/0050491 A1 | 3/2007 | Kataoka et al. | |
| 2007/0061327 A1 * | 3/2007 | Oscherov et al. | 707/10 |
| 2007/0143546 A1 | 6/2007 | Narad | |
| 2007/0266108 A1 | 11/2007 | Patterson et al. | |
| 2008/0089327 A1 * | 4/2008 | Lu et al. | 370/389 |
| 2008/0177839 A1 | 7/2008 | Chang et al. | |
| 2009/0279556 A1 * | 11/2009 | Selitser et al. | 370/401 |

FOREIGN PATENT DOCUMENTS

| | | |
|---|---|---|
| KR | 10-2006-0070287 | 6/2006 |
| WO | 0186510 | 11/2001 |

OTHER PUBLICATIONS

"Why Linda," Scientific Computing Associates, Inc., http://www.lindaspaces.com/products/linda_benefits.html, Copywrite 2007, Accessed May 19, 2009.

"Virtual Shared Memory and the Paradise System for Distributed Computing," Scientific Computing Associates, Inc., Apr. 20, 1999, pp. 1-18, New Haven, Connecticut.

ISA U.S.A., International Search Report of PCT/US08/82840, Jan. 22, 2009, WIPO, 1 page.

ISA U.S.A., International Search Report of PCT/US08/82850, Jan. 16, 2009, WIPO, 1 page.

Office Action issued in Korean Patent Appl. No. 10-2010-7012526; 6 pages (w/ English Translation), Feb. 23, 2015.

Office Action issued in Canadian Patent Appl. No. 2,705,221; 5 pages, Jan. 22, 2015.

Extended European Search Report; Application No. 08847576.9—1853; pp. 6, Feb. 20, 2014.

Office Action issued in India Patent Appl. No. 1705/KOLNP/2010; 1 page, Jun. 2, 2015.

Korean Office Action for Korean Patent Application No. 10-2010-7012526, 9 pages, Sep. 1, 2015.

* cited by examiner

NETWORK WITH DISTRIBUTED SHARED MEMORY

CROSS-REFERENCE TO RELATED APPLICATION

The present application is a continuation of U.S. patent application Ser. No. 12/266,490, filed Nov. 6, 2008, entitled NETWORK WITH DISTRIBUTED SHARED MEMORY, which claims priority to U.S. Provisional Patent Application No. 60/986,377, entitled RESOURCE CLUSTERING IN ENTERPRISE NETWORKS, filed Nov. 8, 2007, the disclosures of both of which are hereby incorporated by reference.

BACKGROUND

The present disclosure relates to sharing memory resources in computer networks. A broad class of computing innovation involves the combining of computing resources to provide various benefits. For example, a wide variety of technologies are used to allow distributed storage devices (e.g., hard drives) to be combined and logically accessed as a unified, shared storage resource. Processing resources have also been combined and/or divided, for example, in multiprocessor and parallel processing systems, and in virtual machine environments.

The sharing of computer memory (RAM) has proved more difficult in many respects. Typically, discrete memory chips are combined by tightly coupling the chips together with specialized bus circuits, such as on RAM modules, desktop computer motherboards, and the like. Accordingly, hardware requirements often impose limitations on the ability to share and/or increase memory capacity. Although various solutions have been proposed, the solutions commonly involve significant architectural changes and often require specialized software to take advantage of the changed memory architecture.

DETAILED DESCRIPTION

Figure 1:
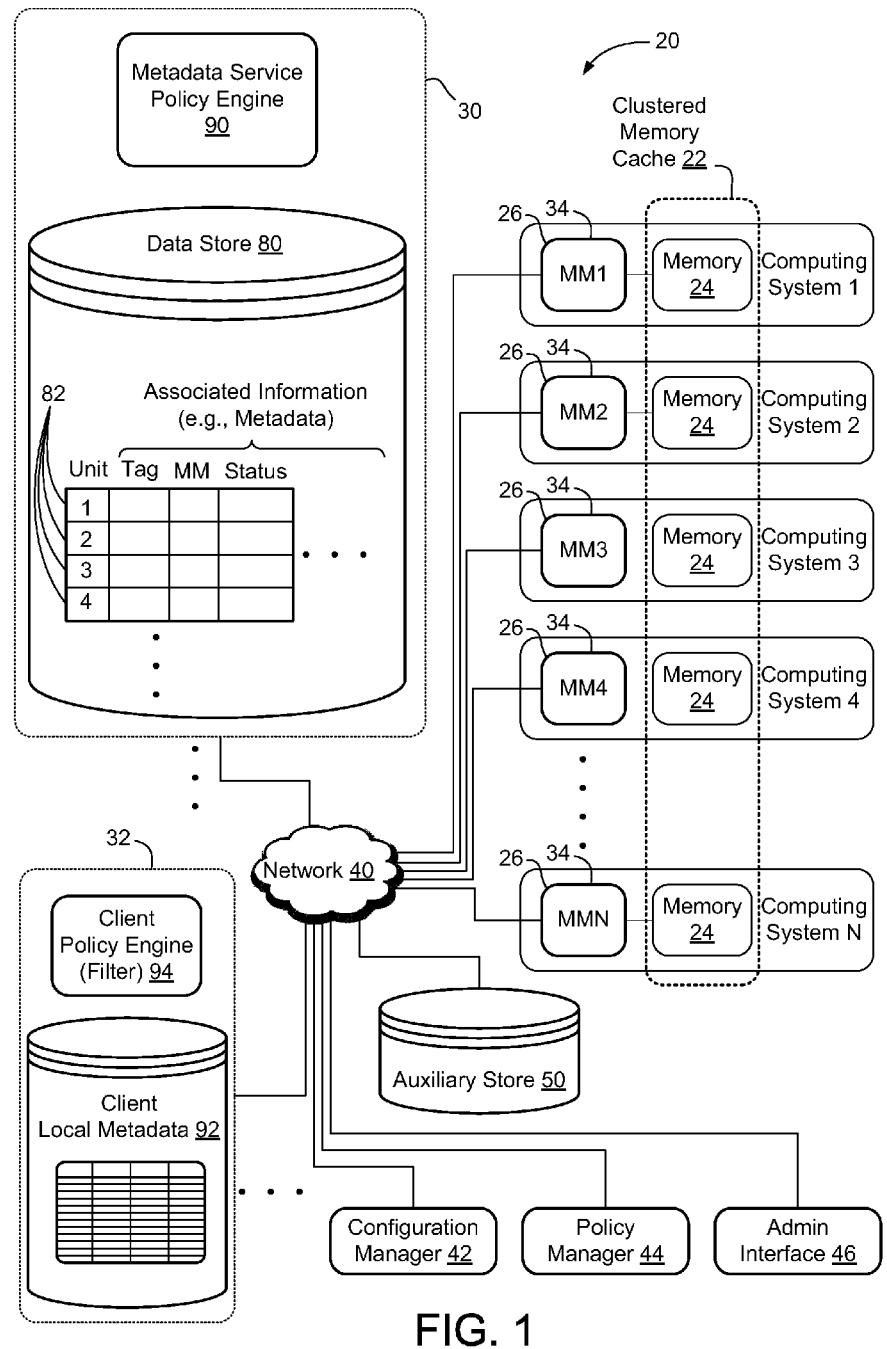
FIG. 1 schematically depicts a network with distributed shared memory according to the present description.

FIG. 1 depicts a computer network 20 with distributed memory. The memory resource and supporting systems may be configured in a variety of different ways and for different applications. Page caching is one example of a setting where numerous advantages can be obtained. Accordingly, the distributed memory resource in the example of FIG. 1, and in other examples discussed herein, includes a clustered memory cache 22. Referring specifically to FIG. 1, clustered memory cache 22 is aggregated from and comprised of physical memory locations 24 on a plurality of physically distinct computing systems 26 (individually designated as Computing System 1, Computing System 2, etc.) Computer network 20 also includes a metadata service 30, a plurality of clients 32 (only one client is shown in the figure), and a plurality of local memory managers 34 (individually designated as MM1, MM2, etc.). Each of the local memory managers is local to and associated with a different portion of clustered memory cache 22. The metadata service, clients and local memory managers are all operatively coupled with each other via network 40. In addition, a configuration manager 42, policy manager 44 and admin interface 46 may also be provided, to provide various functions that will be described below.

Clustered memory cache 22 provides a shared memory resource that can be accessed and used by the clients. Specifically, depending on the mode of operation, clients 32 can read from the clustered memory cache and cause insertion and/or eviction of data items to/from the cache.

As used herein, "client" will at times broadly to refer to any hardware or software entity that makes use of the shared memory resource. For example, clients may include personal computers, workstations, servers and/or applications or other software running on such devices. The invention has proved particular useful in accelerating the performance of server applications that perform operations on large volumes of data, such as complicated modeling and simulation applications in fields such as finance, engineering, etc. In such a setting, the performance of the client application can be enhanced significantly through appropriately managed use of the shared memory resource.

"Client" may also more specifically refer to a driver or other software entity that facilitates access to the shared memory resource. For example, as will be described in more detail, a driver can be loaded into memory of a networked computer, allowing applications and the operating system of that computer to "see" and make use of the clustered cache.

The distributed shared memory described herein may be operated in a variety of modes. Many of the examples discussed herein will refer to a mode where clustered memory cache 22 provides page caching functionality for data used by clients 32. In particular, data items from an auxiliary store 50 may be cached in clustered memory cache 22. Thus, even though a particular client may have ready access to the auxiliary store (e.g., access to a file system stored on a hard disk), it will often be desirable to place requested data in the clustered memory cache, so as to provide faster access to the data. Auxiliary store 50 can include one or more storage devices or systems at various locations, including hard disks, file servers, disk arrays, storage area networks, and the like.

Regardless of the particular mode of operation, the clustered memory cache spans multiple physically distinct computing systems. For example, in FIG. 1, clustered memory cache 22 includes memory from N different computing systems 26 (Computing System 1, Computing System 2, etc., through Computing System N). The individual computing systems can be of varying configurations, for example ranging from relatively low-powered personal devices to workstations to high-performance servers. SMP or other multiprocessor architectures may be employed as well, in which one or more of the computing systems employ multiple processors or cores interconnected via a multiprocessor bus or other interconnect. As described in detail herein, physical memory from these physically distinct systems may be aggregated via network 40 and made available to clients 32 as a unified logical resource.

Referring particularly to local memory managers 34, each memory manager is local to and associated with a different portion of clustered memory cache 22. The memory managers typically are independent of one another, and each is configured to allocate and manage individual units of physical memory in its associated portion of clustered memory cache 22.

The local memory managers typically are configured to manage client references and access to cached data items. As an illustration, assume a particular client 32 needs access to a data item cached in the portion of clustered cache 22 that is managed by memory manager MM1. Assuming the client knows the memory location for the cached item is managed by MM1, the client contacts MM1 to gain access to the cached item. If access is permitted, the memory manager MM1 grants access and maintains a record of the fact that the requesting client has a reference to the memory location. The record may indicate, for example, that the client has a read lock on a particular block of memory that is managed by memory manager MM1.

In some embodiments, clustered memory cache 22 may be implemented using Remote Direct Memory Access (RDMA). RDMA implementations that may be employed include the Virtual Interface Architecture, InfiniBand, and iWARP. In such a setting, the local memory manager may be configured to provide RDMA keys to requesting clients or otherwise manage the respective access controls of the RDMA implementation.

For any given memory manager, the associated portion of the clustered cache will often include many different blocks or other units of memory. In particular, referring to FIG. 2, an exemplary memory manager 34 is depicted, including a cache store 60. In the depicted example, cache store 60 is schematically represented as a table, with a record (row entry) for each block or other unit of physical memory managed by the memory manager. The first column in the example is simply an index, tag or other identifier used to designate a particular block of memory.

Figure 2:
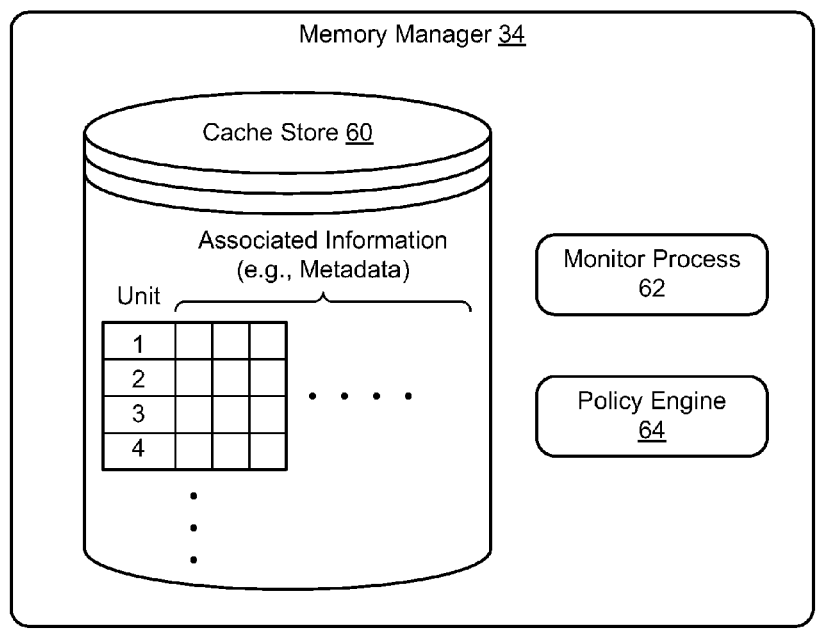
FIG. 2 schematically depicts a memory manager that may be employed in the network of FIG. 1 to manage a portion of a clustered memory cache.

The remaining column or columns contain metadata or other information associated with the corresponding unit of memory and/or the data stored in that unit of memory. As depicted in FIG. 2, memory manager 34 may also include a monitor thread 62 to facilitate the acquisition and updating of the cache store information. The associated information may include, by way of example, information about read locks, write locks and/or other client references to the unit of memory; a filename/path hash or other mechanism for identifying the cached data item(s); status indicators; rates of eviction and insertion; temporal information such as time resident in the cache, time since last access, etc.; block size or other capacity information relating to the unit of memory; and/or other information concerning the memory unit, such as statistical information regarding usage of the memory unit or the items cached in the memory unit. These are but illustrative examples. Also, it should be understood that while cache store 60 is depicted schematically to include the information in a table, a variety of other data structures or mechanisms may be employed to maintain the information store.

Local memory managers 34 may also be configured to receive and respond to requests to insert particular data items into clustered memory cache 22. As will be explained in more detail below, these cache insertion requests can arise from and be initiated by actions of metadata service 30 and clients 32. In some cases, the local memory manager may deny the cache insertion request. One situation where an insertion request can be denied is if the request is directed to a block containing an item that cannot be immediately evicted, for example because there are active client references to the cached item.

Assuming, however, that the insertion request is grantable by the local memory manager, the local memory manager acknowledges and grants the request. The memory manager also coordinates the population of the respective memory block with the data item to be cached, and appropriately updates any associated information for the block in the cache store (e.g., cache store 60).

Similarly, each local memory manager 34 is configured to receive and respond to requests to evict items from its associated portion of clustered memory cache 22. As with insertion requests, the eviction requests can arise from actions of the metadata service 30 and one or more of clients 32, as will be explained in more detail below. Assuming the request is grantable, the memory manager acknowledges and grants the request, and flushes the memory block or takes other appropriate action to make the memory block available for caching of another item.

In some example embodiments, it will be desirable to notify clients 32 when items are to be evicted from the clustered memory cache. Accordingly, the local memory managers may also be configured to maintain back references to clients accessing items in the cache. For example, assume a client requests access to an item in a portion of the cache managed by a memory manager, and that the memory manager has responded by granting a read lock to the client. Having maintained a back reference to the client (e.g., in cache store 60), the local memory manager can then notify the client in the event of a pending eviction and request that the client release the lock.

As discussed above, each local memory manager is local to and associated with a different portion of the clustered memory cache. In the example of FIG. 1, each of the distinct computing systems 26 has an individual memory manager responsible for the physical memory 24 contributed by the system to the clustered cache. Alternatively, multiple local memory managers may be employed within a computing system.

Figure 3:
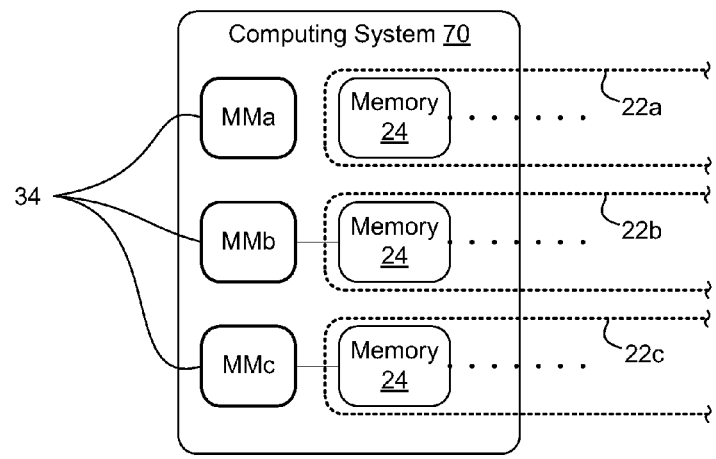
FIG. 3 schematically depicts an alternate configuration of local memory managers.

FIG. 3 depicts an example of an alternate memory manager configuration. As in the previous example, computing system 70 is one of several physically distinct computing systems contributing physical memory 24 to a distributed memory resource. The example of FIG. 3 illustrates two configuration variations that may be applied to any of the examples discussed herein. First, the figure demonstrates a configuration in which the memory contributed from a single computing system is allocated in to multiple different segments. The individual segments, which may or may not be contiguous, are each managed by a different memory manager 34 (individually and respectively designated as MMa, MMb and MMC). As described below, the use of multiple memory managers and memory segments on a single computing system may be used to allow exportation of physical memory to multiple different aggregate memory resources. On the other hand, it may be desirable to employ multiple memory managers even where the memory is contributed to a single cache cluster or other shared memory resource.

Secondly, the figure demonstrates the use of multiple different clusters. Specifically, each local memory manager and memory segment pairing in the FIG. 3 example belongs to a different cache cluster (i.e., clusters 22a, 22b and 22c). Multiple cluster configurations may be employed for a variety of reasons, such as for security reasons, access control, and to designate specific clusters as being usable only by specific applications.

Local memory managers 34 may also be configured to report out information associated with the respective portions of clustered memory cache 22. As discussed above with reference to FIG. 2, each memory manager may include a cache store 60 with information about the memory manager's memory locations. This information may be provided from time to time to metadata service 30, configuration manager 42, and/or other components of the systems described herein.

For example, as will be described in more detail below, metadata service 30 can provide a centralized, or relatively centralized, location for maintaining status information about the clustered cache. In particular, in FIG. 1, memory managers MM1, MM2, etc. through MMN may be considered to all be within a domain that is assigned to metadata service 30. Metadata service 30 can monitor the domain, for example by maintaining information similar to that described with reference to cache store 60, but for all of the memory managers in the domain.

More particularly, metadata service 30 may include a metadata service data store 80 for maintaining information associated with the memory locations in its domain that form the clustered cache. In one class of examples, and as shown in FIG. 1, metadata service data store 80 may include multiple records 82. Specifically, a record 82 is provided for each of the physical memory units of clustered memory cache 22. For example, assume clustered memory cache 22 includes 64 million 8-kilobyte memory blocks (512 gigabytes of addressable cache memory) spread across computing systems 1 through N and local memory managers MM1 through MMN. In this example, metadata service data store 80 could be configured with 64 million records (rows), with each pertaining to one of the cache memory blocks in the cluster. In an alternate example, each record could apply to a grouping of memory locations. Numerous other arrangements are possible.

Various additional information may be associated with the records of metadata service data store 80. In particular, the metadata service may store a tag for each of the memory locations of the cache, as shown in the figure. In one example, the tag allows a requesting entity, such as one of clients 32, to readily determine whether a particular data item is stored in the cache. Specifically, the tag column entries may each be a hash of the path/filename for the data item resident in the associated memory block. To determine whether a requested data item (e.g., a file) is present in the cache, the path/filename of the requested item is hashed using the same hash routine and the resulting hash is compared to the tag column entries of the metadata service data store 80. The path and filename hash described above is but an example; hash methodologies may be employed on other data, and/or other identification schemes may be employed.

Metadata service data store 80 may also indicate an associated local memory manager for each of its records, as shown at the exemplary column designated "MM." For example, data store could indicate that a first memory block or range of memory blocks was managed by memory manager MM1, while a second bock or range of blocks was managed by local memory manager MM2. With such a designation, in the event that a query for a particular item reveals the item is present in the cache (e.g., via a match of the path/filename hash described above), then the response to that query can also indicate which local memory manager 34 must be dealt with to read or otherwise access the cached item.

In the example of FIG. 1, data store 80 also includes a status indication for each of the cache blocks. In one example, each of the cache blocks is indicated as having one of the following statuses: (1) empty, and therefore available to be populated; (2) insertion pending, indicating that the memory block is in the process of being populated with a newly-inserted cached item; (3) active, indicating that the memory block presently contains an active cached data item; or (4) deletion pending, indicating that the data item in the cache block is being deleted. It will be appreciated that these are illustrative examples, and other status information and flags may be employed. The specific exemplary status indications referred to above will be described in further detail below.

The tag, memory manager and status entries described above with reference to the cache blocks in data store 80 are non-limiting examples. As described in more detail below, metadata service 30 and its policy engine 90 typically play a role in implementing various policies relating to the configuration and usage of clustered memory cache 22. Application of various policies can be dependent upon rates of eviction and insertion for a cache block or data item; temporal information such as the time a data item has been cached in a particular block, time since last access, etc.; and/or other information concerning the cache block, such as statistical information regarding usage of the cache block or the data items cached therein.

It will thus be appreciated that the information maintained in metadata service data store 80 may overlap to some extent with the information from the various cache stores 60 (FIG. 2) of the local memory managers. Indeed, as previously indicated, the described system can be configured so that the memory managers provide periodic updates to maintain the information in the metadata service data store 80.

Also, the metadata service may be distributed to some extent across the network infrastructure. For example, multiple mirrored copies of the metadata service may be employed, with each being assigned to a subset of local memory managers. Memory manager assignments would be dynamically reconfigured to achieve load balancing and in the event of failure or other changes in operating conditions of the environment.

Various examples will now be described illustrating how clients 32 interact with metadata service 30 and local memory managers 34 to access clustered memory cache 22. The basic context of these examples is as follows: a particular client 32 (FIG. 1) is running on an applications server executing a data-intensive financial analysis and modeling program. To run a particular analysis, the program must access various large data files residing on auxiliary store 50.

In a first example, the financial analysis program makes an attempt to access a data file that has already been written into clustered memory cache 22. This may have occurred, for example, as a result of another user causing the file to be loaded into the cache. In this example, client 32 acts as a driver that provides the analysis program with access to the clustered memory cache 22. Other example embodiments include client 32 operating in user mode, for example as an API for interacting with the clustered resource.

In response to the client request for the data file, metadata service 30 determines that the requested file is in fact present in the cache. This determination can be performed, for example, using the previously-described filename/path hash method. Metadata service 30 then responds to the request by providing client with certain metadata that will enable the client to look to the appropriate portion of the clustered memory cache (i.e., the portion containing the requested file).

In particular, metadata service 30 responds to the request by identifying the particular local memory manager 34 which is associated with the portion of the cache containing the requested file. This identification may include the network address of the local memory manager, or another identifier allowing derivation of the address. Once the client has this information, the client proceeds to negotiate with the local memory manager to access and read the requested file from the relevant block or blocks managed by the memory manager. This negotiation may include granting of a read lock or other reference from the local memory manager to the client, and/or provision of RDMA keys as described above.

As shown in FIG. 1, client 32 may include a local store 92 of metadata. In the above example, this local store may be used by the client to record the association between the requested data file and the corresponding local memory manager and respective portion of the clustered cache. Thus, by consulting local store 92, subsequent page cache accesses to the cached file can bypass the step of querying metadata service 30. Indeed, clients 32 typically are implemented to first consult local store 92 before querying metadata service 30, thereby allowing clients to more directly and efficiently access cached items. Metadata service 30 thus functions in one respect as a directory for the clustered memory cache 22. Clients having up-to-date knowledge of specific entries in the directory can bypass the directory and go directly to the relevant local memory manager.

Another example will now be considered, in which the file requested by the analysis program is not present in clustered memory cache 22. As before, the analysis program and/or client 32 cause the file request to issue, and the request is eventually received at metadata service 30. Prior to messaging of the request to metadata service 30, however, the local client store 92 of metadata is consulted. In this case, because the requested file is not present in the cache, no valid metadata will be present in the local store. The request is thus forward to metadata service 30.

In response to the request, metadata service 30 cannot respond with a memory manager identification, as in the previous example, because the requested file is not present in the clustered memory cache. Accordingly, the hash matching operation, if applied to metadata service data store 80, will not yield a match.

The metadata service can be configured to implement system policies in response to this type of cache miss situation. Specifically, policies may be implemented governing whether the requested item will be inserted into the clustered memory cache, and/or at what location in the cache the item will be written. Assuming clustered cache 22 is populated with the requested item, the metadata service data store 80 will be updated with metadata including the designation of the responsible memory manager 34. This metadata can then be supplied in response to the original request and any subsequent requests for the item, so that the cached version can be accessed through client interactions with the appropriate memory manager.

The systems and methods described herein may be configured with various policies pertaining to the shared memory resource. Policies may control configuration and usage of the clustered memory cache; client access to the cache; insertion and eviction of items to and from the cache; caching of items in particular locations; movement of cached items from one location to another within the cache; etc. Policies may also govern start/stop events, such as how to handle failure or termination of one of the computing systems contributing memory locations to the cluster. These are non-limiting examples—a wide variety of possibilities exist.

In the example of FIG. 1, configuration manager 42, admin interface 46 and policy manager 44 perform various functions in connection with the policies. In particular, admin interface 46 can provide a command-line, graphical or other interface that can be used by a system administrator to define policies and control how they are applied. Configuration manager 42 typically is adapted to coordinate startup events, such as the login or registration of entities as they come on-line. In many settings, startup procedures will also include distribution of policies.

For example, in FIG. 1, initialization of clients 32 is handled by configuration manager 42. Specifically, when coming on-line, each client 32 initializes and registers with configuration manager 42. Configuration manager 42 provides the initializing client with addresses of the appropriate metadata service 30. Configuration manager 42 may also retrieve relevant policies from policy manager 44 and distribute them to the client, which stores them locally for implementation via client policy engine 94 (FIG. 1).

Configuration manager 42 typically also coordinates registration and policy distributions for metadata service 30 and local memory managers 34. The distributed policies are stored locally and implemented via metadata service policy engine 90 (FIG. 1) and memory manager policy engines 64 (FIG. 2), respectively. From time to time during operation, the size and underlying makeup of the clustered memory resource may change as local memory managers launch and terminate, either intentionally or as a result of a failure or other unintentional system change. These startups and terminations may be handled by the configuration manager, to provide for dynamic changes in the shared memory resource. For example, during periods where heavier usage volume is detected (e.g., an escalation in the number of cache insertion requests), the configuration manager may coordinate with various distributed devices and their associated memory managers to dynamically scale up the resource. On the other hand, performance lags or other circumstances may dictate a dynamic adjustment where one or more memory managers are taken off-line. As described in more detail below, the present system may be configured to permit migration of cache data from one location to another in the shared resource. The startups and terminations described above are one example of a situation where such data migration may be desirable.

As indicated above, policy manager 44 typically is configured to provide a master/central store for the system policy definitions, some or all of which may be derived from inputs received via admin interface 46. Policy manager 44 may also validate or verify aggregate policies to ensure that they are valid and to check for and resolve policy conflicts. The policy manager 44 typically also plays a role in gathering statistics relating to policy implementations. For example, the policy manager may track the number of policy hits (the number of times particular policies are triggered), and/or the frequency of hits, in order to monitor the policy regime, provide feedback to the admin interface, and make appropriate adjustments. For example, removal of unused policies may reduce the processing overhead used to run the policy regime.

As should be appreciated from the foregoing, although the policies may be defined and managed centrally, they typically are distributed and implemented at various locations in the system. Furthermore, the policy ruleset in force at any given location in the system will typically vary based on the nature of that location. For example, relative to any one of memory managers 34 or clients 32, metadata service 30 has a more system-wide global view of clustered memory cache 22. Accordingly, policy rulesets affecting multiple clients or memory managers typically are distributed to and implemented at metadata service 30.

Referring to clients 32, and more particularly to the client policy engines 94 incorporated into each client, various exemplary client-level policy implementations will be described. Many example policies implemented at the clients operate as filters to selectively control which client behaviors are permitted to impact the shared memory resource. More specifically, the client policy engine may be configured to control whether requests for data items (e.g., an application attempting to read a particular file from auxiliary store 50) are passed on to metadata service 30, thereby potentially triggering an attempted cache insertion or other action affecting the clustered cache.

The selective blocking of client interactions with metadata service 30 operates effectively as a determination of whether a file or other data item is cacheable. This determination and the corresponding policy may be based on a wide variety of factors and criteria. Non-limiting examples include:

(1) Size—i.e., items are determined as being cacheable by comparing the item size to a reference threshold. For example, files larger than N bytes are cacheable.

(2) Location—i.e., items are determined as being cacheable depending on the location of the item. For example, all files in a specified path or storage device are cacheable.

(3) Whitelist/Blacklist—a list of files or other items may be specifically designated as being cacheable or non-cacheable.

(4) Permission level or other flag/attribute—for example, only read-only files are cacheable.

(5) Application ID—i.e., the cacheable determination is made with respect to the identity of the application requesting the item. For example, specified applications may be denied or granted access to the cache.

(6) User ID—e.g., the client policy engine may be configured to make the cacheable determination based on the identity of the user responsible for the request.

(7) Time of Day.

In addition, these examples may be combined (e.g., via logical operators). Also, as indicated above, the list is illustrative only, and the cacheability determination may be made based on parameters other than the cited examples.

Cache insertion policies determine whether or not a file or other data item may be inserted into clustered memory cache 22. Typically, cache insertion policies are applied by metadata service 30 and its policy engine 90, though application of a given policy will often be based upon requests received from one or more clients 32, and/or upon metadata updates and other messaging received from the local memory managers 34 and maintained in metadata service data store 80 (FIG. 1).

In some examples, administrators or other users are able to set priorities for particular items, such as assigning relatively higher or lower priorities to particular files/paths. In addition, the insertion logic may also run as a service in conjunction with metadata service 30 to determine priorities at run time based on access patterns (e.g., file access patterns compiled from observation of client file requests).

Further non-limiting examples of cache insertion policies include:

(1) Determining at metadata service 30 whether to insert a file into clustered memory cache 22 based on the number and/or frequency of requests received for the file. The metadata service can be configured to initiate an insertion when a threshold is exceeded.

(2) Determining at metadata service 30 whether to insert a file into clustered memory cache 22 based on available space in the cache. This determination typically will involve balancing of the size of the file with the free space in the cache and the additional space obtainable through cache evictions. Assessment of free and evictable space may be based on information in metadata service data store 80.

(3) Determining at metadata service 30 whether to insert a file into clustered memory cache 22 based on relative priority of the file.

Metadata service 30 also implements eviction policies for the clustered memory cache 22. Eviction policies determine which data items to evict from the cache as the cache reaches capacity. Eviction policies may be user-configured (e.g., by an administrator using admin interface 46) based on the requirements of a given setting, and are often applied based on metadata and other information stored at metadata service 30 and/or memory managers 34.

In particular, metadata service 30 may reference its data store 80 and predicate evictions based on which memory location within its domain has been least recently used (LRU) or least frequently used (LFU). Other possibilities include evicting the oldest record, or basing evictions on age and frequency based thresholds. These are but examples, and evictions may be based upon a wide variety of criteria in addition to or instead of these methods.

As previously mentioned, although metadata service 30 has a global view of the cache and is therefore well-positioned to make insertion/eviction determinations, the actual evictions and insertions typically are carried out by the memory managers 34. Indeed, the insertion/eviction determinations made by metadata service 30 are often presented to the memory managers as requests that the memory managers can grant or deny. In other cases, the memory manager may grant the request, but only after performing other operations, such as forcing a client to release a block reference prior to eviction of the block.

In other cases, metadata service 30 may assign higher priority to insertion/eviction requests, essentially requiring that the requests be granted. For example, the overall policy configuration of the system may assign super-priority to certain files. Accordingly, when one of clients 32 requests a super-priority file, if necessary the metadata service 30 will command one or more memory managers 34 to evict other data items and perform the insertion.

The general case, however, is that the local memory managers have authority over the cache memory locations that they manage, and are able in certain circumstances to decline requests from metadata service 30. One reason for this is that the memory managers often have more accurate and/or current information about their associated portion of the cache. Information at the memory managers may be more granular, or the memory managers may maintain certain information that is not stored at or reported to metadata service 30. On the other hand, there may be delays between changes occurring in the cache and the reporting of those changes from the respective memory manager to metadata service 30. For example, metadata service 30 might show that a particular block is evictable, when in fact its memory manager had granted multiple read locks since the last update to the metadata service. Such information delays could result from conscious decisions regarding operation of the clustered cache system. For example, an administrator might want to limit the reporting schedule so as to control the amount of network traffic associated with managing the shared memory resource.

The above-described distribution of information, functionality and complexity can provide a number of advantages. The highly-distributed and non-blocking nature of many of the examples discussed herein allows them to be readily scaled in large datacenter environments. The distributed locking and insertion/eviction authority carried out by the memory managers allows for many concurrent operations and reduces the chance of any one thread blocking the shared resource. Also, the complicated tasks of actually accessing the cache blocks are distributed across the cluster. This distribution is balanced, however, by the relatively centralized metadata service 30, and the global information and management functionality it provides.

Furthermore, it should be appreciated that various different persistence modes may be employed in connection with the clustered memory resource described herein. In many of the examples discussed herein, a read-only caching mode is described, where the clustered resource functions to store redundant copies of data items from an underlying auxiliary store. Performance is dramatically enhanced, because the cluster provides a shareable resource that is much faster than the auxiliary store where the data originates. However, from a persistence standpoint, the data in the cluster may be flushed at any time without concern for data loss because the cluster does not serve as the primary data store. Alternatively, the cluster may be operated as a primary store, with clients being permitted to write to locations in the cluster in addition to performing read operations. In this persistence mode, the cluster data may be periodically written to a hard disk or other back-end storage device.

A further example of how the clustered memory resource may be used is as a secondary paging mechanism. Page swapping techniques employing hard disks are well known. The systems and methods described herein may be used to provide an alternate paging mechanism, where pages are swapped out the high performance memory cluster.

The exemplary policy regimes described herein may also operate to control the location in clustered memory cache 22 where various caching operations are performed. In one class of examples, metadata service 30 selects a particular memory manager 34 or memory managers to handle insertion of a file or other item into the respective portion of the cache. This selection may be based on various criteria, and may also include spreading or striping an item across multiple portions of the cluster to provide increased security or protection against failures.

In another class of examples, the metadata service coordinates migration of cached items within clustered memory cache 22, for example from one location to another in the cache. This migration may be necessary or desirable to achieve load balancing or other performance benefits.

Figure 4:
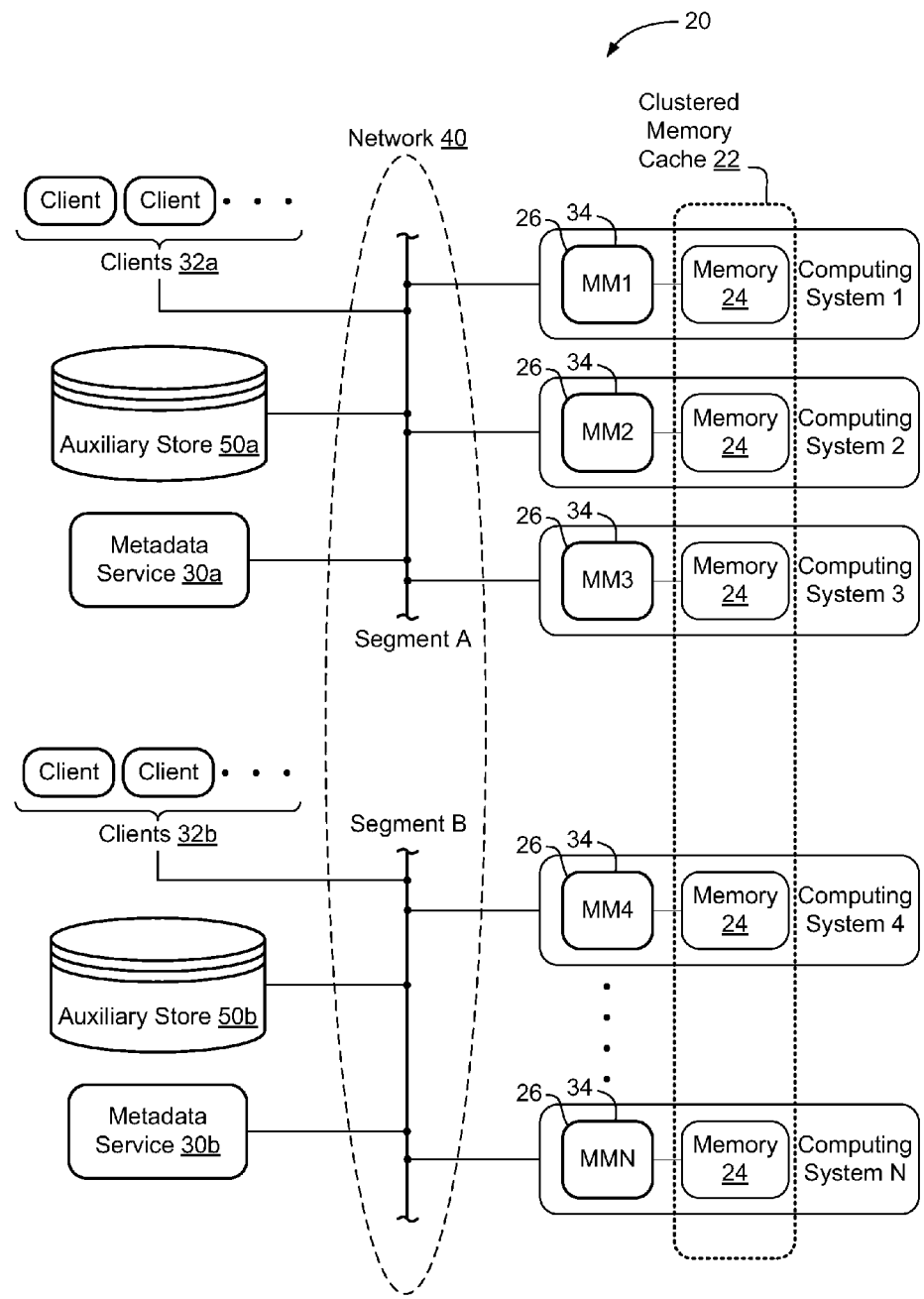
FIG. 4 schematically depicts a distributed shared memory environment with a clustered memory resource distributed across multiple network segments.

A variety of exemplary locality policies will now be described, at times with reference to FIG. 1 and FIG. 4. FIG. 4 depicts another example of a shared-memory computer network 20. The depicted example is similar in many respects to the example of FIG. 1, except that network 40 includes multiple segments. Two segments are depicted: Segment A and Segment B. The segments may be separated by a router, switch, etc. As before, clustered memory cache 22 is comprised of memory 24 from multiple physically distinct computing systems 26, however some portions of the cache are local to network Segment A, while others are local to network Segment B. Clients 32a, auxiliary store 50a and metadata service 30a are on Segment A, while Clients 32b, auxiliary store 50b and metadata service 30b are on Segment A In a first example, cache insertion locality is determined based on relative usage of memory locations 24. Usage information may be gathered over time and maintained by memory managers 34 and the metadata services, and maintained in their respective stores. Usage may be based on or derived from eviction rates, insertion rates, access frequency, numbers of locks/references granted for particular blocks, etc. Accordingly, when determining where to insert an item in clustered memory cache 22, the metadata service may select a less utilized or underutilized portion of the cache to achieve load balancing.

The metadata service may also coordinate migration of cache items from one location to another based on relative usage information. For example, if information in metadata service data store 80 (FIG. 1) indicates unacceptable or burdensome over-usage at memory managers MM2 and MM3, metadata service 30 can coordinate relocation of some of the data items to other memory managers (e.g., memory managers MM1 or MM4).

In another example, locality policies are implemented based on location of the requesting client. Assume for example, with reference to FIG. 4, that a cache insertion request is triggered based on an application associated with one of clients 32a (Segment A). The policy configuration could be implemented such that this would result in an attempted insertion at one of the Segment A memory managers (MM1, MM2 or MM3) instead of the Segment B managers.

In another example, the relative location of the underlying data item is factored into the locality policy. Referring to FIG. 4, policies may be configured to specify that files located on auxiliary store 50b (on Segment B) are to be cached with the Segment B memory managers 34. This may be the case even where the requesting client is located on Segment A. Where policy implementations compete, as in this example, other aspects of the policy configuration can resolve the conflict, for example through prioritization of various components of the overall policy regime.

From the above, it should be understood that locality may be determined by tracking usage patterns across the cluster and migrating memory blocks to nodes optimized to reduce the total number of network hops involved in current and anticipated uses of the cluster. In many cases, such optimization will significantly reduce latency and potential for network congestion. The usage data may be aggregated from the clients by the configuration manager and propagated to the metadata service(s) as a form of policy that prioritizes various cache blocks.

The policy implementation may also be employed to detect thrashing of data items. For example, upon detecting high rates of insertion and eviction for a particular data item, the system may adjust to relax eviction criteria or otherwise reduce the thrashing condition.

A further locality example includes embodiments in which a block or data item is replicated at numerous locations within the clustered memory resource. For example, in a caching system, multiple copies a given cache block could be sited at multiple different locations within the clustered cache. A metadata service query would then result in identification of one of the valid locations. In certain settings, such replication will improve fault tolerance, performance, and provide other advantages.

Figure 5:
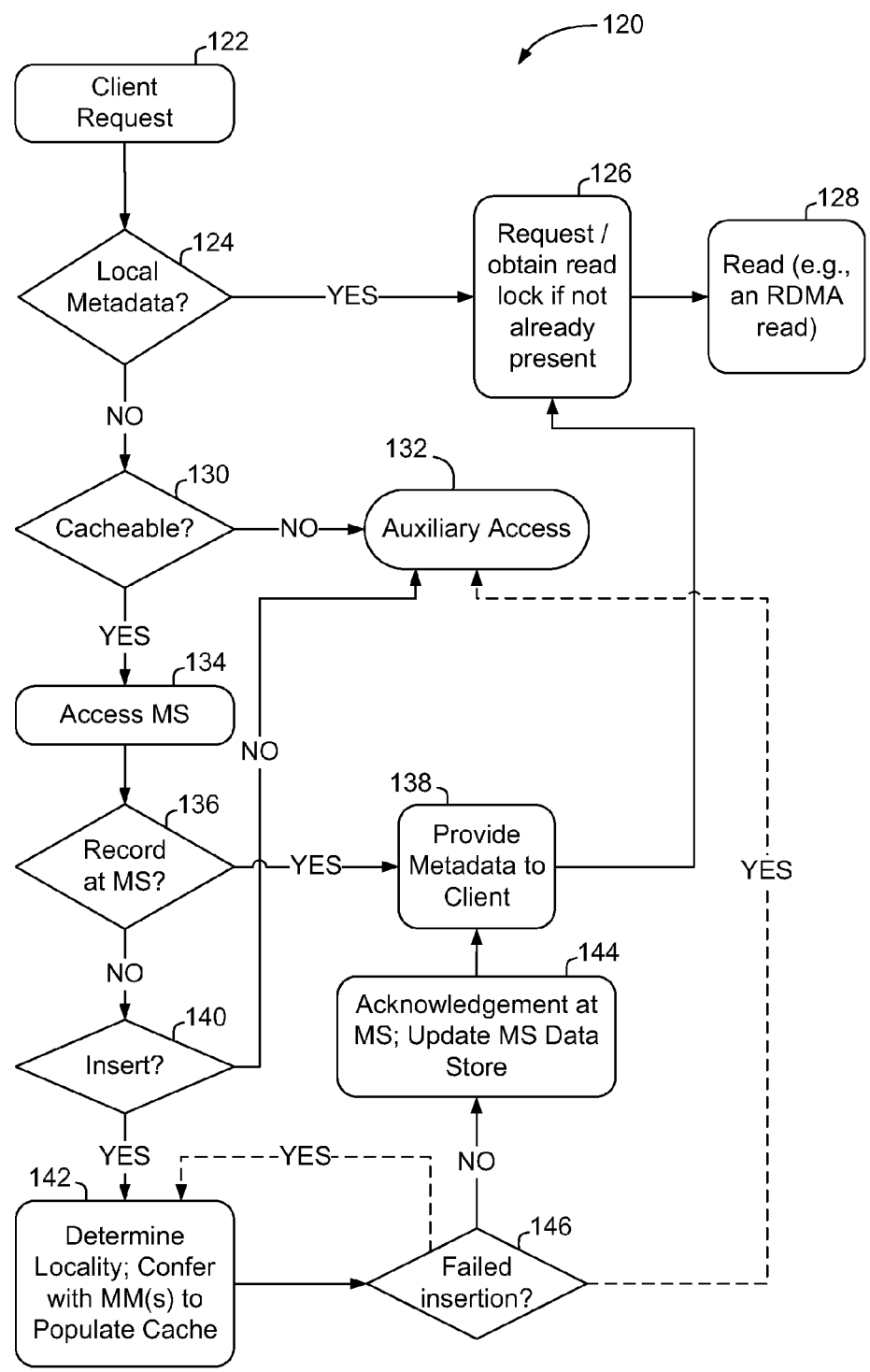
FIG. 5 depicts an exemplary method for using a distributed shared memory resource.

Referring now to FIG. 5, an example shared memory method 120 will be described, in the context of client entities accessing a clustered memory cache. As before, the clustered memory cache is aggregated from and comprised of physical memory on multiple physically distinct computing systems. The context further includes attempts by the clients to access data items that are stored in an auxiliary store, but which may also be inserted into the clustered memory cache.

The method may generally include running a local memory manager on each of a plurality of physically distinct computing systems operatively coupled with each other via network infrastructure. One or more metadata services are instantiated, and operatively coupled with the network infrastructure. Communications are conducted between the metadata service(s) and the local memory managers to provide the metadata service with metadata (e.g., file/path hashes, usage information/statistics, status, etc.) associated with the physical memory locations. The metadata service is then operated to provide a directory service and otherwise coordinate the memory managers, such that the physical memory locations are collectively usable by clients as an undifferentiated memory resource.

Referring specifically to the figure, at 122, method 120 may also include issuing of a client request. As in the examples described above, the request may originate or issue from an operating system component, application, driver, library or other client entity, and may be directed toward a file or other data item residing on a file server, disk array or other auxiliary store.

As shown at 124, method 120 may also include checking a local store to determine whether metadata is already available for the requested item. The existence of local metadata indicates that the requested item is currently present and active in the clustered memory cache, or at least that it was at some time in the past. If local metadata is available, a read lock is obtained if necessary (126) and the item is read from its location in clustered memory cache (128).

In the context of FIG. 1, these steps could correspond to an application request, via client 32, for a particular file located on auxiliary store 50. In response to the request, client 32 would retrieve valid metadata for the requested file from local metadata store 92. The retrieved metadata would indicate the particular memory manager 34 for the data item, and/or would otherwise indicate the location of the data item in clustered memory cache 22. The requesting client would then access the item from its location in the cache, for example by interacting with the respective memory manager to obtain a read lock and perform an RDMA read of the cached item.

Continuing with FIG. 5, if it cannot be determined from the local store that the requested item is or had been cached in the shared memory resource, method 120 may include a determination of whether the item is eligible for caching, as shown at 130. Referring again to FIG. 1, client 32 and its policy engine 94 provide examples of components configured to make the eligibility determination of step 130. Specifically, as discussed above, the client and policy engine may filter the passing of requests to metadata service 30, and thereby filter the usage of clustered memory cache.

If the requested item is not eligible for caching, the request is satisfied by means other than through the clustered memory cache. In particular, as shown at 132, the client request is satisfied through auxiliary access, for example by directly accessing a back-end file system residing on auxiliary store 50 (FIG. 1).

Proceeding to 134, a metadata service may be accessed for eligible requests that cannot be initiated with locally stored metadata. Similar to the inquiry at step 124, the metadata service is queried at 136 to determine whether metadata exists corresponding to the client request. If the metadata service has current metadata for the request (e.g., the address of a local memory manager overseeing a portion of cache 22 where the requested item is cached), then the metadata is returned to the requesting entity (138), and the access and read operations may proceed as described above with reference to steps 126 and 128.

The absence of current metadata at the queried metadata service is an indication that the requested item is not present in the shared memory resource (e.g., clustered memory cache 22 of FIG. 1 does not contain a non-stale copy of a file requested by one of clients 32). Accordingly, as shown at 140, method 120 may include determining whether an attempt will be made to insert the requested item into the shared memory. If the item will not be inserted, the client request must be serviced other than through use of the shared resource, as previously described and shown at 132.

Continuing with FIG. 5, if an insertion is to be made, method 120 may include determining the locality of the insertion, as shown at 142. More particularly, an assessment may be made as to a specific location or locations within the shared memory resource where the item is to be placed.

As in the various examples discussed with reference to FIG. 1, the locality determination may be made based on various parameters and in accordance with system policy configurations. In some cases, locality will also be determined in response to data gathered during operation, for example usage statistics accumulated at a metadata service based on reports from memory managers.

As also shown at 142, the cache insertion may also include messaging or otherwise conferring with one or more local memory managers (e.g., memory managers MM1, MM2, etc. of FIG. 1). This communication may include requests, acknowledgments and the like. As an illustration, metadata service 30 might determine, based on usage statistics and certain metadata, to attempt to cache a requested block of data in a memory location managed by memory manager MM4. Metadata service 30 would send the insertion request to memory manager MM4, which could then grant the request and permitted the requested block to be written into its managed memory location 24. The interaction of metadata service 30 and memory manager MM4 can also include receiving an acknowledgment at the metadata service, as shown at 144.

As previously discussed, the memory manager in some cases may deny the insertion request, or may honor the request only after performing an eviction or other operation on its managed memory location(s). Indeed, in some cases, insertion requests will be sent to different memory managers, successively or in parallel, before the appropriate insertion location is determined. In any event, the insertion process will typically also include updating the metadata service data store, as also shown at 144. For example, in the case of a cached file, the data store 80 of metadata service 30 (FIG. 1) may be updated with a hash of the path/filename for the file.

As shown at 146, if the insertion is successful, metadata may be provided to the client and the access and read operations can then proceed (138, 126, 128). On the other hand, failed insertion attempts may result in further attempts (142, 144) and/or in auxiliary access of the requested item (132).

Figure 6:
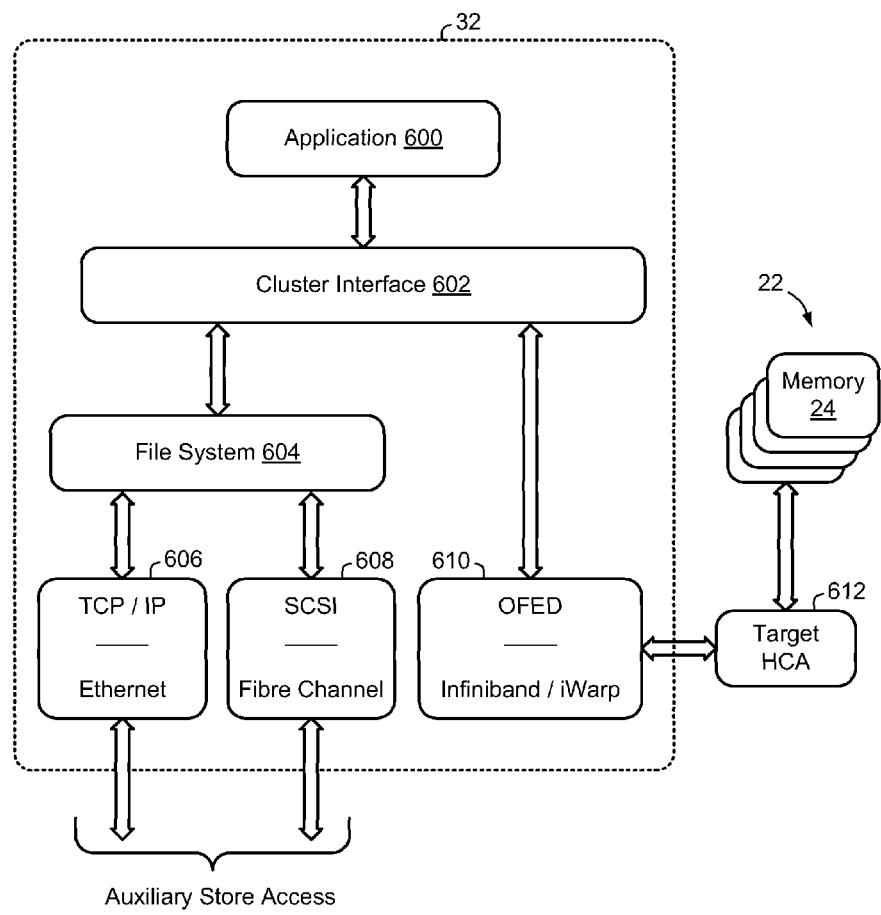
FIGS. 6 and 7 schematically depict communication stack configurations that may be employed to enable devices to access a distributed shared memory resource.
Figure 7:
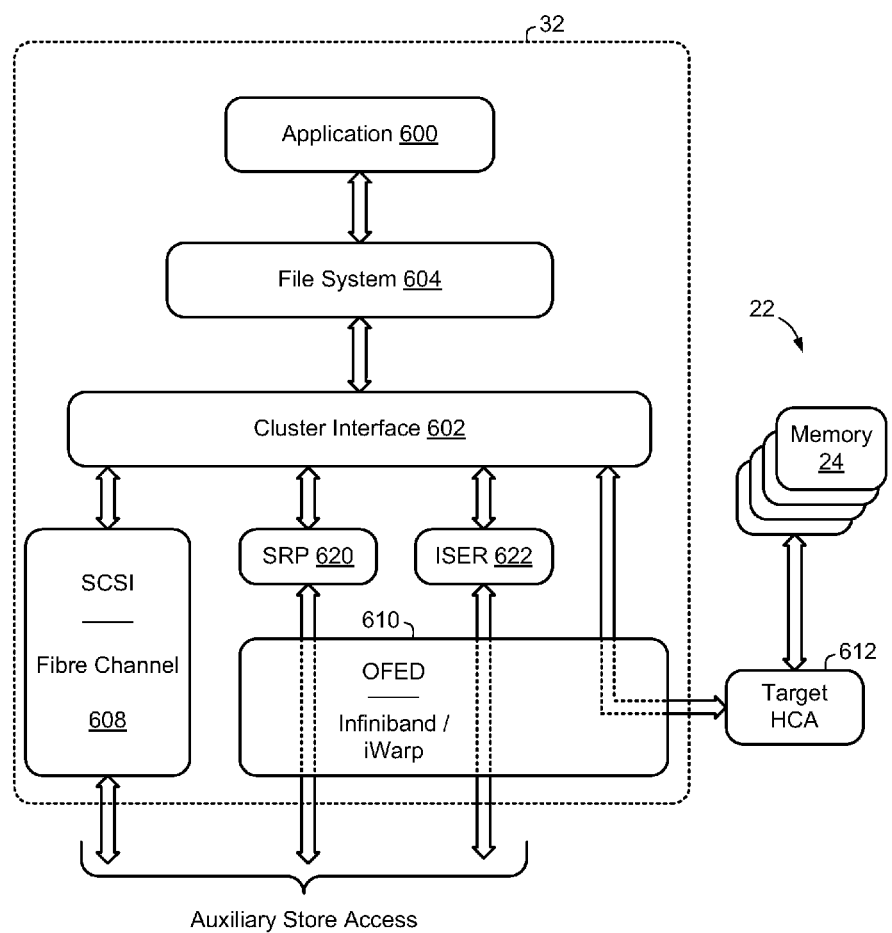

Referring now to FIGS. 6 and 7, the figures depict exemplary architectures that may be employed to provide clients 32 with access to the shared memory resource(s). The figures depict various components of client 32 in terms of a communications stack for accessing data items, and show access pathways for reading data items from an auxiliary store (e.g., auxiliary store 50 of FIG. 1) or from a clustered memory resource (e.g., clustered memory cache 22 of FIG. 1), which typically provides faster and more efficient access than the auxiliary store access.

In the example of FIG. 6, cluster interface 602 is disposed in the communications stack between application 600 and file system abstraction layer 604. Auxiliary store access may be made by the file system layer through known mechanisms such as TCP/IP—Ethernet layers 606, SCSI—Fibre Channel layers 608, and the like. As discussed above, auxiliary store access may occur for a variety of reasons. The file requested by application 600 might be of a type that is not eligible for loading into clustered memory cache. Cluster interface 602 may apply a filter that blocks or prevents access to the shared memory resource, as in step 130 of the exemplary method of FIG. 5. Alternatively, auxiliary store access may be performed after a failed cluster insertion attempt, as shown at steps 146 and 132 of FIG. 5.

Alternatively, cluster interface 602 is configured to bypass file system layer 604 in some cases and read the requested data from a location in the shared memory resource (e.g., a memory location 24 in clustered memory cache 22), instead of from the auxiliary store 50. As indicated, this access of the clustered resource may occur via a client RDMA layer 610 and a target host channel adapter 612.

Cluster interface 602 may perform various functions in connection with the access of the shared memory resource. For example, interface 602 may search for and retrieve metadata in response to a request for a particular file by application 600 (e.g., as in step 124 or steps 134, 136 and 138 of FIG. 5). Interface 602 may also interact with a metadata service to insert a file into the clustered cache, and then, upon successful insertion, retrieve metadata for the file to allow the cluster interface 602 to read the file from the appropriate location in the clustered cache.

In one example embodiment, cluster interface 602 interacts with the virtual memory system of the client device, and employs a page-fault mechanism. Specifically, when a requested item is not present in the local memory of the client device, a virtual memory page fault is generated. Responsive to the issuance of the page fault, cluster interface 602 performs the previously described processing to obtain the requested item from the auxiliary store 50 or the shared memory cluster. Cluster interface 602 may be configured so that, when use of the clustered cache 22 is permitted, item retrieval is attempted by the client simultaneously from auxiliary store 50 and clustered memory cache 22. Alternatively, attempts to access the clustered cache 22 may occur first, with auxiliary access occurring only after a failure.

FIG. 7 alternatively depicts a block-based system, where cluster interface 602 is positioned between the file layer 604 and block-based access mechanisms, such as SCSI—Fibre Channel layer 608 and SRP 620, ISER 622 and OFED—Infiniband/iWarp layers 610. In this example, the mechanisms for storing and accessing blocks are consistent with the file-based example of FIG. 6, though the data blocks are referenced from the device with an offset and length instead of via the file path.

Depending on the particular configuration employed at the client, block-level or file-level invalidation may be employed. For example, in the event that an application is writing to a data item that is cached in the clustered resource, the cached copy is invalidated, and an eviction may be carried out at the local memory/cache manager in the cluster where the item was stored. Along with the eviction, messaging may be sent to clients holding references to the cached item notifying them of the eviction. Depending on the system configuration, the clients may then perform block or file-level invalidation.

Furthermore, it will be appreciated that variable block sizes may be employed in block-based implementations. Specifically, block sizes may be determined in accordance with policy specifications. It is contemplated that block size may have a significant affect on performance in certain settings.

Finally, configurations may be employed using APIs or other mechanisms that are not file or block-based.

It will be appreciated that the computing devices described herein may be any suitable computing device configured to execute the programs described herein. For example, the computing devices may be a mainframe computer, personal computer, laptop computer, portable data assistant (PDA), computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A computer network with distributed shared random access memory (RAM), comprising:
   a clustered memory cache aggregated from and comprised of physical memory locations on RAM chips of a plurality of physically distinct computing systems, the plurality of physically distinct computing systems each including a processor and a memory and operatively coupled via the computer network;
   a plurality of local cache managers each executed by the processor and the memory of one of the plurality of physically distinct computing systems, each of the local cache managers being local to and associated with a portion of the clustered memory cache;
   a metadata service, executed by a processor and a memory of a first computing system, and operatively coupled with each of the local cache managers via a network and including a metadata store that stores, for each of the portions of the clustered memory cache, a hash of a path to the portion of the clustered memory cache indicating which of the plurality of local cache managers manages that portion of the clustered memory cache;
   a plurality of clients operatively coupled with the metadata service and the local cache managers; and
   a configuration manager, executed by a processor and a memory of a second computing system, and operatively coupled to the plurality of clients, the configuration manager configured to register each of the clients with the metadata service,
   where in response to a request issuing from any of the clients for a data item present in the clustered memory cache, the metadata service is configured to send a response to the client with an identification of the local cache manager associated with the portion of the clustered memory cache containing such data item based on the hash of the path to the portion of the clustered memory cache in the metadata store, the identification of the local cache manager being different from an identification of the metadata service.

2. The computer network of claim 1, where at least some of the local cache managers are separated from the metadata service via network connections of the computer network.

3. The computer network of claim 2, where in response to a request issuing from any of the clients for a data item not present in the clustered memory cache, the metadata service is configured to select a location of the clustered memory cache for caching of such data item.

4. The computer network of claim 2, where in response to a request issuing from any of the clients for a data item not present in the clustered memory cache, the metadata service is configured to control whether or not an attempt will be made to cache such data item in the clustered memory cache.

5. The computer network of claim 2, where each of the local cache managers is configured to control granting of locks to any of the clients requesting access to data items cached in the portion of the clustered memory cache associated with the local cache manager.

6. The computer network of claim 2, where the metadata service IS configured to maintain a metadata store of metadata for the portions of the clustered memory cache, and where the metadata is updated in response to messaging received from the local cache managers.

7. The computer network of claim 6, where the metadata includes a status indicator for each of the portions of the clustered memory cache.

8. The computer network of claim 6, where the metadata includes information about cache locks granted to clients for the different portions of the clustered memory cache.

9. The computer network of claim 2, where the clustered memory cache is configured to permit caching of application-specific data.

10. The computer network of claim 2, where the clustered memory cache is configured to dynamically vary in size during operation.

11. The computer network of claim 10, where the configuration manager is configured to register additional physical memory locations to be added to the clustered memory cache, and where the configuration manager is configured to engage in messaging with the metadata service regarding such additions, thereby permitting dynamic variation in size of the clustered memory cache.

12. The computer network of claim 11, where such additional physical memory locations are on additional physically distinct computing systems.

13. The computer network of claim 2, where the metadata service is configured to direct cache insertion requests and cache eviction requests to the local cache managers, the local cache managers being configured to selectively grant or deny such requests and perform the respective insertions and evictions when such requests are granted.

14. The computer network of claim 2, where the metadata service is configured to control a relocation of a cached data item from a first location in the clustered memory cache to a second location in the clustered memory cache.

15. The computer network of claim 2, where each of the local cache managers is running on a different one of the physically distinct computing systems, and where the portion of the clustered memory cache associated with that local cache manager is comprised of physical memory locations on the same physically distinct computing system.

16. The computer network of claim 2, where the local cache managers are configured such that any access request by one of the clients for a data item in the clustered memory cache is negotiated between the client and the local cache manager associated with the portion of the clustered memory cache containing the data item.

17. A method of operating a networked random access memory (RAM) resource, comprising:
running a local memory manager on a processor and a memory of each of a plurality of physically distinct computing systems operatively coupled with each other via network infrastructure;
instantiating a metadata service on a processor and a memory of a first computing system operatively coupled with each of the local memory managers via the network infrastructure;
registering each of a plurality of clients with the metadata service using a configuration manager, the configuration manager instantiated on a processor and a memory of a second computing system;
conducting communications between the local memory managers and the metadata service to provide the metadata service with information about physical RAM locations disposed on each of the plurality of physically distinct computing systems;
storing, at a metadata service data store included in the metadata service, the information as a plurality of tags, each of the plurality of tags including a hash of a path of a data item resident in the physical RAM location associated with that tag, each tag being associated with one of the physical RAM locations;
for each of the plurality of tags, storing, at the metadata service data store, memory management information including an indication of which of the local memory managers is associated with that tag; and
employing the metadata service as a directory service to facilitate aggregation of and addressing of the physical RAM locations of each of the plurality of physically distinct computing systems, such that the physical RAM locations are collectively usable by the plurality of clients as an undifferentiated memory resource.

18. The method of claim 17, further comprising, in response to a client request for a requested data item, determining whether the requested data item is cached in the undifferentiated memory resource by performing a hashing operation on the requested data item and comparing a resulting hash to the plurality of tags in the metadata service data store.

19. The method of claim 18, where determining whether the requested data item is cached in the undifferentiated memory resource includes querying the metadata service, and where if the data item is present in the undifferentiated memory resource, the metadata service is configured to respond with identification of a particular location within the undifferentiated memory resource from which the data item may be accessed based on the memory management information stored in the metadata service data store.

20. The method of claim 17, further comprising, in response to a client request for a data item, determining whether to place a copy of the data item in the undifferentiated memory resource.

21. The method of claim 20, where determining whether to place a copy of the data item in the undifferentiated memory resource includes determining, at a source of the client request, whether the data item is eligible for caching in the undifferentiated memory resource.

22. The method of claim 20, where determining whether to place a copy of the data item in the undifferentiated memory resource includes determining, at the metadata service, whether the data item is eligible for caching in the undifferentiated memory resource.

23. The method of claim 20, further comprising, in response to a client request for a data item, determining a particular location in the undifferentiated memory resource to place a copy of the data item.

24. The method of claim 23, where determining the particular location in the undifferentiated memory resource to place a copy of the data item includes comparing a data path from a user of the data item to a first candidate location with the data path from the user of the data item to a second candidate location.

25. The method of claim 23, where determining the particular location in the undifferentiated memory resource to place a copy of the data item includes comparing a data path from an auxiliary store of the data item to a first candidate location with the data path from the auxiliary store of the data item to a second candidate location.

26. A networked computer system with a networked random access memory (RAM) resource, comprising:
    a plurality of local memory managers, each of which is configured to run on a processor and a memory of a different one of a plurality of physically distinct computing systems operatively coupled with each other via network infrastructure; a metadata service, executed by a processor and a memory of a first computing system, operatively coupled with each of the local memory managers via the network infrastructure; and
    a configuration manager, executed by a processor and a memory of a second computing system, and operatively coupled to the metadata service, where the configuration manager is configured to register each of a plurality of clients with the metadata service,
    where the metadata service and the local memory managers are configured to communicate with each other to provide the metadata service with a plurality of hashes of paths to physical RAM locations disposed on each of the plurality of physically distinct computing systems, the metadata service including a metadata service data store that stores the plurality of hashes of paths to physical RAM locations as a plurality of tags and memory management information including an indication of which of the local memory managers is associated with each of the plurality of tags, each tag being associated with one of the physical RAM locations;
    and where the metadata service is configured to provide a directory service to facilitate aggregation of and addressing of the physical RAM locations of each of the plurality of physically distinct computing systems, such that the physical RAM locations are collectively usable by the plurality of clients as an undifferentiated memory resource.

27. The system of claim 26, where the metadata service is configured to respond to a client request for a data item by determining whether the data item is cached in the undifferentiated memory resource.

28. The system of claim 27, where the metadata service is configured to respond to the client request by indicating where the data item is cached in the undifferentiated memory resource.

29. The system of claim 26, where the metadata service is configured to respond to a client request for a data item by determining whether to place a copy of the data item in the undifferentiated memory resource.

30. The system of claim 26, where the metadata service is configured to control whether data items accessible from the networked computer system are to be cached in the undifferentiated memory resource.

31. The system of claim 26, where the metadata service is configured to respond to a client request for a data item by determining where to cache the data item in the undifferentiated memory resource.

* * * * *